US009589479B1

(12) United States Patent
Regnier (10) Patent No.: US 9,589,479 B1
(45) Date of Patent: *Mar. 7, 2017

(54) SYSTEMS AND METHODS FOR CHOREOGRAPHING MOVEMENT USING LOCATION INDICATORS

(71) Applicant: Patrice M. Regnier, New York, NY (US)

(72) Inventor: Patrice M. Regnier, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,586

(22) Filed: Jan. 21, 2016

Related U.S. Application Data (63) Continuation of application No. 14/669,209, filed on Mar. 26, 2015, now Pat. No. 9,275,617.

(60) Provisional application No. 61/974,953, filed on Apr. 3, 2014.

(51) Int. Cl.
*H04H 40/00* (2009.01)
*G09B 19/00* (2006.01)
*G09B 5/04* (2006.01)

(52) U.S. Cl.
CPC ........... *G09B 19/0015* (2013.01); *G09B 5/04* (2013.01); *G09B 19/00* (2013.01)

(58) Field of Classification Search
CPC .............................................. G10H 2240/311
USPC ....................................................... 455/3.06
See application file for complete search history.

(56) References Cited

U.S. PATENT DOCUMENTS

| 3,595,122 A | 7/1971 | Brediceanu |
| 3,876,953 A | 4/1975 | Abel |
| 4,408,187 A | 10/1983 | Rollins |
| 4,917,373 A | 4/1990 | Bourne et al. |
| 5,589,654 A | 12/1996 | Konwiser et al. |
| 6,027,428 A | 2/2000 | Thomas et al. |
| 6,462,662 B1 | 10/2002 | Rondow et al. |
| 6,898,759 B1 | 5/2005 | Terada et al. |
| 2002/0155416 A1 | 10/2002 | Barton |
| 2003/0024375 A1 | 2/2003 | Sitrick |
| 2004/0127335 A1 | 7/2004 | Watterson et al. |
| 2006/0029913 A1 | 2/2006 | Alfieri |
| 2008/0043203 A1 | 2/2008 | Jacobs et al. |
| 2011/0053131 A1 | 3/2011 | Regnier et al. |

OTHER PUBLICATIONS

U.S. Appl. No. 14/669,209, Non-Final Office Action, Nov. 25, 2015.
U.S. Appl. No. 14/669,209, Notice of Allowance, Jan. 5, 2016.

*Primary Examiner* — Tu X Nguyen
(74) *Attorney, Agent, or Firm* — Winston & Strawn LLP (57) ABSTRACT

Methods and apparatus for choreographing movement of individuals for a performance event are disclosed. In an embodiment, a method includes providing a performance event configuration having a plurality of location indicators to assist in the placing or movement of individuals conducting a performance event. The method also includes implementing the real time application that implements a process executable on a wireless audio unit and that synchronously transmits body movement instruction signals to the audio units of an individual that is participating in the performance. The wireless audio unit is preferably a wireless, cellular, or mobile telephone that is configured with the appropriate software to receive the signals and to play audio directions for each individual that correspond to choreographed and coordinated body movements to direct the individuals at, towards or away from the location indicators to carry out the performance event.

20 Claims, 9 Drawing Sheets

SYSTEMS AND METHODS FOR CHOREOGRAPHING MOVEMENT USING LOCATION INDICATORS

CROSS-REFERENCE TO RELATED APPLICATIONS

This application is a continuation of application Ser. No. 14/669,209 filed Mar. 26, 2015, which claims the benefit of provisional application 61/974,953 filed Apr. 3, 2014, the entire content of each of which is expressly incorporated herein by reference thereto.

FIELD OF THE INVENTION

The invention generally relates to systems for machine control of human actions. In an implementation, the invention is a multimedia composition tool that utilizes software on a computer system to generate a series of scored commands on a timeline corresponding to a choreographed piece, and then transmits in real time the commands to a person or groups of people who perform the piece. The commands also include directions to specific location indicators within a performance configuration.

BACKGROUND ART

Rehearsing new choreography can be time consuming as even trained dancers must learn individual movements in the context and phrasing of all movements of a piece. The most time consuming difficulty is not in having a trained dancer learn individual movements, but in having the dancer learn the movements in the context or phrasing of those movements. In order for a dancer to successfully put movement A after movement B, followed by movement C, it is necessary for the dancers' body to learn that sequence before the dancer can reproduce it in a manner that the choreographer or audience might see it, as the actual performance of the idea.

Simple cueing systems are known for use in the performing arts, but are not intended as an aid for reducing rehearsal time. It has been recognized that actors, musicians, dancers and other performers must be alerted when performing to the need to initiate certain actions, and oral cueing or directing has been used for decades for this purpose. However, oral cueing can create problems. For example, during the production of a filmed entertainment, audio directions or voice cues can result in unwanted sounds on film audio tracks, missed instructions because one or more performers did not hear the instructions, difficulties in directing multiple performers without human error, and an inability to direct some performers who are either too far away to hear or are located in enclosed areas where audible directions cannot be heard.

Thus, there exists a need for methods and systems that can be used with performers to make it possible to create instant choreography, as if it had been rehearsed. Such systems and methods would dramatically aid the rehearsal process, so that a choreographed piece can be performed by a group or groups of persons efficiently without the need for hours of rehearsals.

SUMMARY OF THE INVENTION

The present invention relates to a method and apparatus for choreographing and synchronizing movement of individuals for performance event. One method includes providing a performance event configuration that includes a plurality of location indicators placed throughout a performance event location. The method also includes providing each individual of a group with a wireless audio unit, and synchronously transmitting body movement instruction signals in real time to the audio units of each individual of the group. The individuals of the group may also be referred to as performers or players. The audio units are configured to receive the signals and to play audio directions for each individual to carry out body movements at appropriate times. The audio directions also include directions to perform the body movements at, towards or away from at least one location indicator. The individual giving the audio directions may be referred to as a composer or a pilot. The coded signals are transmitted to provide coordinated body movement among the individual to create interaction. The carrying out of the body movements by the individuals results in a choreographed performance event.

In one embodiment, the performance event configuration is a performance stage, such as a theater stage, a practice room, an outside venue, etc. In another embodiment, the location indicators identify to an individual a specific area of the performance event location. The performance stage may have a stage floor and the location indicators may include marked floor positions and peripheral markings outside of the stage floor. The location indicators may also identify to an individual a specific area of the performance event location. For example, a location indicator may be place throughout a performance event location, such as on the floor, on a wall, on a door, or on any freestanding object. The location indicator may also be any indicated freestanding object, such as a prop, furniture, etc. The location indicator may also be indicated by different shapes, colors and any identifying or distinguishing marks. The location indicator may just act as an identifying mark to direct an individual towards. In one embodiment, the marked floor positions comprise an alphanumeric character, a color, one or more lines, or a symbol and the peripheral markings are positioned outside or above the performance stage and include a wall or curtain marking, a light, a flag, a post, or other identifiable or recognizable object including clothing or other individuals or performers.

In another embodiment, the body movement instruction signals are preferably coded. The instructions are generally transmitted to the audio units under the control of a suitably programmed computer and wireless transmitter. At least some of the individuals may be, and preferably are, remotely located from others in order to achieve a multi-locational or multi-geographical event. The body movement instruction signals may include voice commands, and such voice commands may include coded commands that are selected from a compilation that is provided to the individuals. The method may also advantageously include synchronizing the voice commands with at least one of music accompaniment, visual effects or changing scenery. In addition, the method may include providing choreographic movements to additional individuals that do not have audio units to further enhance the event. In an implementation, the event is an artistic performance, an interactive game, or a medical, emotional or psychological therapy or training and the movements of one or more of the individuals of the group or groups are choreographed and coordinated to carry out the performance event.

Advantageously, body movement instruction signals are synchronously transmitted over one or more channels to the audio units of each individual of the group. In one particular embodiment, the audio units may be mobile, cellular or wireless telephones. In another embodiment, the audio units may be tablet devices. In another embodiment, the wireless audio units may include wearables, such as Google Glass, watches, pedometers, etc. An individual may use headphones, such as ear buds, to listen to the body movement instructions from the audio unit. Audio units may also be wireless headsets that are communicatively coupled to a computer or other transmitting device that is capable of transmitting the coded body movement instructions. The wireless headset may also be capable of receiving and decoding the coded body movement instructions. The body movement instructions may be transmitted over a network, such as a mobile telephone network, or over any other medium by which the telephones or other wireless units receive information, such as "Bluetooth" or "WiFi." In addition, many mobile telephone networks maintain time and date information, which is provided to the telephones on the network. This information may be used to synchronize the time at which body movement instruction signals are transmitted, or the time at which individuals are given voice commands. Also, the body movement instructions may be provided by a synchronous real-time web application. The body movement instructions may also be provided by a native mobile application on a smartphone. The body movement instructions may also be provided through a web browser, mobile or otherwise. The entire system may be implemented by the same web application and the body movement instructions are transmitted via the web application.

Also, the web application, mobile application or similar system may also provide the ability for each user to have a user name and password so that the user can log in to a profile specific to that person. The profile information may include information, such as commands or groups of commands downloaded or purchased, social media information, etc. The user may also be provided the ability to invite friends to use the application. Within the mobile application, the user may be provided with the ability to download and/or purchase a "deck" of commands. The user may also have the option to pick and choose each command they would like to download. The application may provide the ability to randomize a deck or set of commands. The deck or set of commands may include a common theme, such as children's games, ice breakers, dance moves, dating games, etc.

The instructions can be forwarded by a keyboard or by an app residing on the portable audio unit. When forwarded by a keyboard, a pilot, instructor or administrator can forward the instructions by pushing a key or button which is preprogrammed to forward the instruction to one or more or the participants or performers. Furthermore, one or more instructions or coded instruction signals can be forwarded tone or more performers at a time. The application may also provide the pilot with information during a session as to how many times a particular command has been used or when it was last used so to not to use the same command over and over again.

The web application may also be capable of easily updating and maintaining content and user access through a content management system. The web application may also provide highly customized administrative and user functionality. The web application may also include messaging capabilities between other users or administrators. The application may also provide the ability for users to connect with each other by adding other users as friends or connections. The application may also provide the ability to send an event completion notification after an event has been completed. Also, the system may allow for multiple pilots or directors to control an event. It should be appreciated that the web application may be in communication with one or more servers. The servers may store information, such as commands, user profile information, etc., and the servers may transmit information to the web application, such as commands. It should also be appreciated that the web application may be used across many different platforms and is not limited to only one browser, operating system or device.

The timing of the transmission of body movement instructions is typically synchronized to time and date information maintained by a network. Thus, the body movement instruction signals may include a time of delivery to the individual(s) that is independent of the time at which the instructions are actually sent. The body movement instruction signals may be transmitted to the audio units under the control of a suitably programmed computer and wireless transmitter, wherein each audio unit establishes the timing for the actual presentation of each voice command using a local clock with sufficient accuracy to insure synchrony of coordination. The body movement instruction signals generally include coded voice commands that include two-step "When I Say Go (WISG)" voice commands where the first step in the voice command describes the action to be performed, and the second step in the voice command is timed to trigger the initiation of the body movements. These body movement instruction signals can include coded commands that are selected from a compilation that is provided to the individuals, and the compilation includes coded commands that are stored in the audio units with the commands comprising known movement instructions that have been cumulatively developed for the performance event with suitable codes representing each entry. Furthermore, the coded commands can be transmitted to the audio units to select the appropriate voice commands from the compilation stored in the audio units.

The method further comprises synchronizing the voice commands with at least one element of music accompaniment, visual effects or changing scenery, and providing the synthetic spatial placement of voice commands in a virtual sound field with appropriate background sound or music to improve the effectiveness of communications to the individuals whose motion is being choreographed. Suitable events include an artistic performance, an exercise regimen, an interactive game, or a medical, physical, emotional or psychological therapy or training to the individuals with the movements of the individuals of the group choreographed and coordinated to carry out the event. The method may also include providing choreographic movements to additional individuals that do not have audio units to further enhance the event, wherein at least some of the individuals are remotely located from others in order to achieve a multi-geographical event. If desired, at least some of the body movement instruction signals can be transmitted by SMS or text message.

Another aspect of the invention pertains to a multi-channel system for choreographing and synchronizing movement of individuals. In an embodiment, the system includes a device including at least one display and input means for generating body movement instruction signals, a transmitter for transmitting the body movement instruction signals over at least one channel, and a wireless audio unit provided to each individual of a group for receiving the body movement instruction signals. The signals are interpreted by the audio units into audible body movement directions for each individual such that the individuals move in a choreographed and coordinated manner.

The transmitter preferably synchronously transmits the body movement instruction signals over multiple channels. The audio units can be a cellular or mobile telephone and the body movement instructions can be transmitted over a network such as a telephone network. These telephones generally include software, which organizes body movement instruction signals received by the telephone. Also, the wireless audio receiving unit may further comprise a local clock with sufficient accuracy to insure synchrony of coordination.

In an advantageous embodiment, the multi-channel system also includes a second display for showing a representation of the movement of the performers. Beneficially, the wireless audio receiving unit includes a microprocessor, a digital media card, and a headset with audio speakers. In an implementation, the device for generating body movement instruction signals includes appropriate software and is at least one of a MIDI keyboard, a MIDI digital device, an APPLE® personal computer, a personal computer running a WINDOWS® operating system, and a tablet device, etc. In addition, the apparatus may include a digital media read/write unit and the wireless audio receiving unit is capable of two-way communication. Advantageously, the multi-channel system also includes choreographing software provided on the device for generating body movement instructions, to facilitate creation of a choreographed event. In a preferred embodiment, the audio unit is capable of two-way communication with the device.

Another embodiment of the invention pertains to a computer program product, residing on a computer readable medium, for generating a choreographed piece for transmission to individuals. The computer program product includes instructions for causing a computer to provide at least one track and cues for defining a sequence of choreographing instructions over a timeline to generate a choreographed piece, store at least a portion of the choreographed piece, and generate command signals corresponding to the choreographing instructions for transmission on at least one channel to wireless audio units. Each wireless audio unit is associated with an individual of at least one group and is configured to translate the command signals into audio body movement directions such that a choreographed event can be performed. A preferred wireless audio unit is a cellular or mobile phone that can receive the body movement instruction signals or that include an app for receiving the coded command signals.

In an advantageous variation of this embodiment, the choreographing instructions include at least one of movement instructions, states, and properties. In addition, the computer program product may include instructions for causing a computer to generate optional command signals to synchronize outside events with the choreographed event, and/or may include instructions for causing a computer to learn and categorize additional choreography instructions. In a beneficial embodiment, the computer program product includes instructions for causing a computer to automatically update movement instructions according to predefined popularity criteria.

Another embodiment relates to a method for choreographing and synchronizing movement of individuals for a performance event at a performance event location by using a real-time application comprising implementing the real time application, wherein the application implements a process executable on a wireless audio unit comprising; and synchronously transmitting body movement instruction signals in real time to the wireless audio unit of an individual who is participating in the performance event, wherein the signal instructs the audio unit to play audio directions for the individual to carry out body movements at appropriate times, with the audio directions also including directions to the individual to perform the body movements at, towards or away from at least one indicator at the performance event configuration, and to create interaction between other individuals that are participating in the performance event, so that the carrying out of the body movements by the participating individuals results in a choreographed performance event.

In another embodiment, a user may use the mobile application to create an event to publically lobby and invite other players using the application to join. Once a desired number of players have joined, the user who started the event acts as the pilot and then can begin to select and send commands to the rest of the players. At the end of the event, the users may be able to share their experiences on social media, such as Facebook, Twitter, Instagram, etc.

BRIEF DESCRIPTION OF THE DRAWINGS

Other aspects, purposes and advantages of the invention will become clear after reading the following detailed description with reference to the attached drawings, in which.

DETAILED DESCRIPTION OF THE PREFERRED EMBODIMENTS

Figure 1:
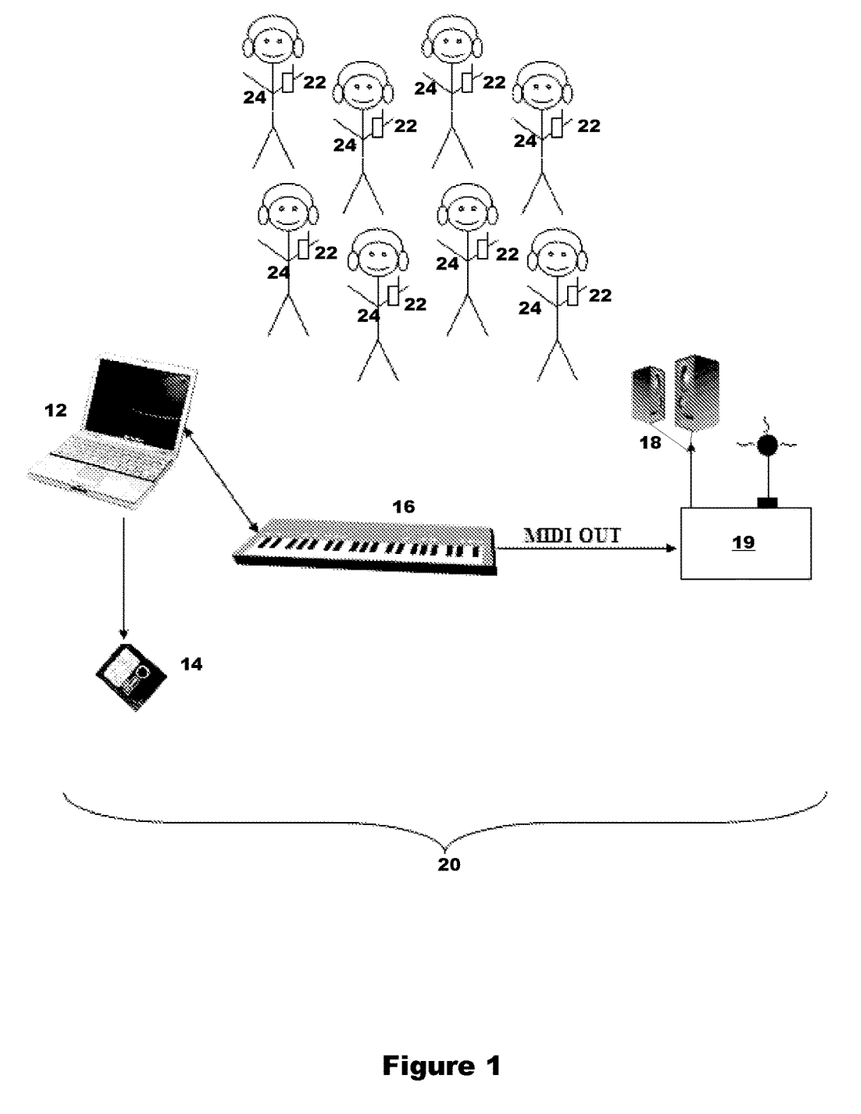
FIG. 1 illustrates an embodiment of a multi-channel, sampling broadcast system according to an embodiment of the invention.

FIG. 1 illustrates an embodiment of a multi-channel, sampling broadcast system 10. The system 10 can be used, for example, to direct a plurality of dancers arranged into various groups to perform a choreographed dance routine. A wireless transmission system 20 includes a personal computer 12, a digital media read/write unit 14, a MIDI piano keyboard 16, stereo speakers 18, and a transmitter 19. The keyboard 16 output is forward to a transmitter that is connected to speakers 18 that may be used to play performance music, background music, or to produce other sounds. The computer is connected to the keyboard and the digital media by USB cables or a wireless arrangement. The transmitter 19 also wirelessly transmits instructions to a plurality of cellular or mobile telephones or audio playback units 22. The audio playback units may be in the form of specialized receivers worn by dancers 24. In this example, a plurality of dancers 24 are wearing audio playback units 22 that receive commands that are transmitted wirelessly from the transmitter 19. The playback units provide audio instructions to each dancer in the groups of dancers indicating when and how to move. Computer sequencing software run by the personal computer 12 ensures that each dancer will receive his or her instructions at the correct time. The software may also be implemented via a web application.

A dictionary of suggestive and exact instructions has been developed which contains words and phrases that any person could understand and use to perform movements. The dictionary of instructions may be stored on a database. The dictionary may include thousands of actions, commands, qualifiers and standards. Thus, untrained persons could participate in a choreographed event just by listening and responding to the commands. This dictionary includes encouragements, instructions for personal physical interpretation, for personal emotional interpretation, for direct movements, for directions, and for grouping. The instructions found in the dictionary are intuitive, easy to understand, and easy to follow. For example, personal physical interpretation instructions may include such phrases as: "walk backwards in the shape of a triangle", "draw a duck in the air", "hover around the center of the action", "waltz sideways", and "make a star while skipping". Personal emotional interpretation instructions could include "get angry at the floor", "flirt with the person next to you", "give a speech", and "beg someone for mercy". Direct movement instructions may include "run", "jump", "skip", and "glide". Examples of directional instructions include: "go to the red flag", "face the fountain", and "turn towards the door". Grouping instructions may include: "find two people and make a group of three", and "in single file follow the person waving his arm overhead". Instructions grouped as "encouragements" may include: "faster", "slower", "keep going", "with gusto", and "quietly."

Each instruction or command may include one or more actions, qualifiers and/or standards. Actions are generally instructions to perform a single action, such as running in place, skip to the left, pretend to play an instrument, etc. Qualifiers may be adverbs that give context to the action. For example, running in place drunkenly or skip to the left lazily are examples of actions with qualifiers. Whereas "drunkenly" and "lazily" would be examples of qualifiers. Standards may include faster, slower, freeze, energetic, etc. Each command does not always have to include qualifiers and standards each time. Also a command may be a micro command that only includes one action or it also may be a macro command that includes a combination of either multiple actions or includes qualifiers and/or standards.

The body movement instructions do not have to be complete sentences or completely detailed to control every movement of the individual to allow the individual to provide his or her own expression of the action. To facilitate providing the instructions to the performers, the signals can be coded with the individual receiving the signals either knowing the code or having software for decoding them. Coding can be in at least two modes; one for identifying the individual, either alone or as part of a subgroup of the entire number of performers, and the other for instructing the performer as to what body movement to conduct.

The signals include body movement instructions that are coordinated between and among the performers. At least some, most or even all of the signals direct body movements that cause interaction between some or all of the performers. "Interaction" as used herein means the movement of one individual into close proximity or even into contact, with another to carry out the performance. Interaction can include conversation, real or apparent; motioning or directing one performer to act or move in a certain way; or even to hold hands, pull or push each other or to conduct other actions that two or more individuals would conduct by interaction in the real world.

Commands to play some of these words and phrases could be broadcast to one or more groups of dancers or performers during an event, so that the choreographer can see how a portion of an overall piece would look. Alternately, a certain sequence of commands could be broadcast to one or more groups of performers that corresponds to an entire performance piece. Each performer can belong to one or more groups, and an individual performer may belong to a group of one. In addition, it may be possible for a performer to be switched from one group to another during a performance. Since each dancer does not have to memorize a sequence, a choreographer utilizing the system can see the dance ideas performed right away, as opposed to having to rehearse each of the movements of the routine for hours and hours before being able to see the overall results. Also, in a group there might be a designated "leader" where sometimes or all of the time, the leader receives slightly or very different commands from the rest of the group.

In general, the instructions are provided in a two-step "When I Say Go (WISG)" format. The first step in the voice command describes the action to be performed, and the second step in the voice command is timed to trigger the actual action. This provides the dancers time to prepare to perform the action, and therefore increases the choreographer's ability to see an accurate representation of their ideas without rehearsal.

Figure 7:
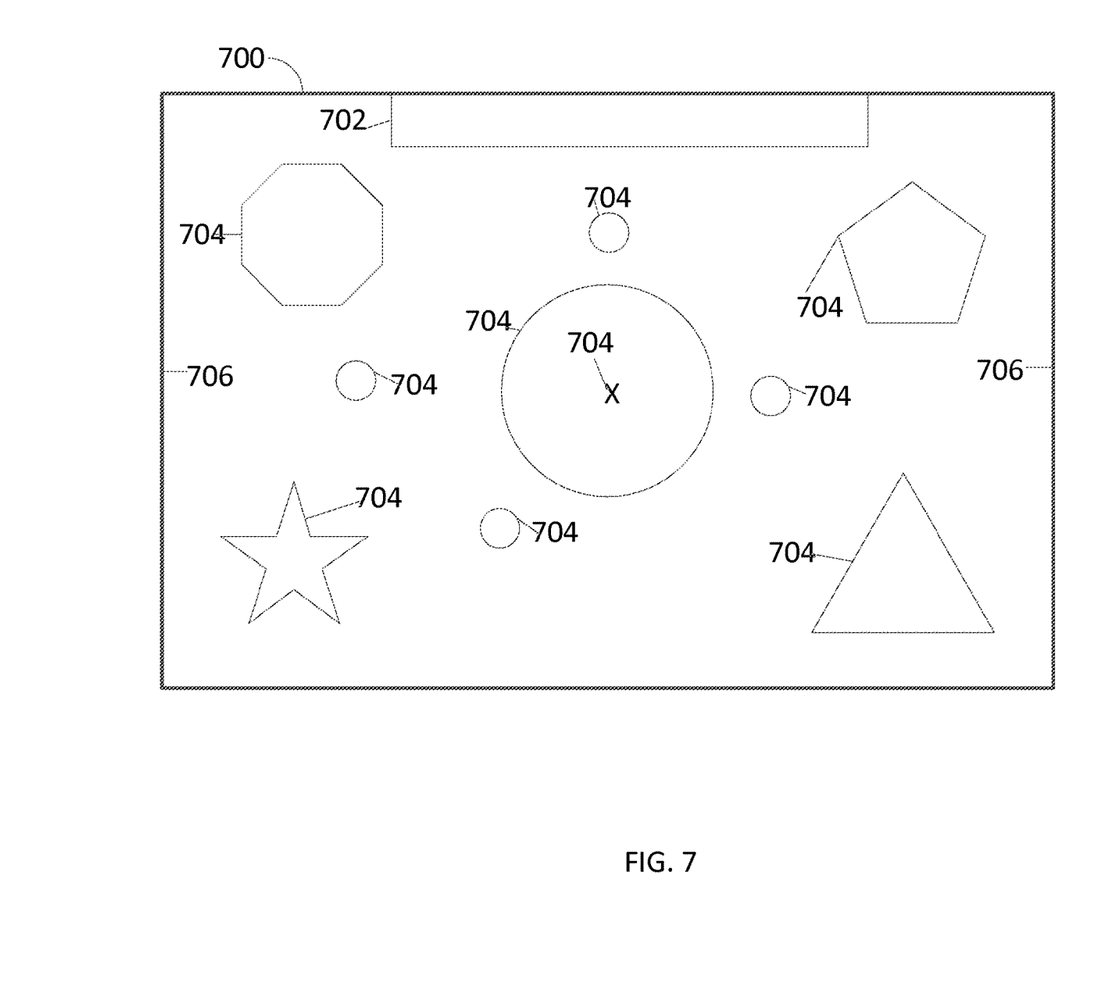
FIG. 7 is an exemplary illustration of a performance event configuration according to an embodiment of the invention.

As described further herein in particular with the description of FIG. 7, the performance is conducted on a particular area or location, which for convenience is referred to herein as a performance stage. Conventional stages in theaters or as set up for concerts or other outdoor performances are preferred examples, but a performance stage can be any location or area in which the individuals or performers can carry out the transmitted body movements. The location indicators are provided to assist the placing and movement of individuals on the performance stage. Some of these indicators may be placed directly upon the stage floor upon which the individuals are moving. These indicators are typically letters, numbers, words, colored spots or targets, props, lines or symbols. They can be permanent or temporary, and they could be changed before or even during a performance. Although, generally, they remain in one position when the performance is on a conventional stage. Additional location indicators are provided outside or above the performance stage. These can include wall or curtain markings of the type described above for the floor markings. They can also include lights, flags, posts or other objects and, if desired, the objects can be provided with color, indicia, markings or other identifiable features. The object can also be clothing or other items carried by or upon other performers, or even can be the other performers themselves.

Also, the commands may include directions to perform body movements in the direction of a location indicator within the performance configuration. For example, the commands may include, "Group 1 go to pink; Group 2 go to red; Group 3 go to blue; and Group 4 go to the center circle." The pink, red, blue and center circles are location indicators that inform the group(s) where to the perform body movements or whether to perform such movements towards or away from the indicator. Location indicators may also include props or items that are worn by individuals participating in the performance event. Any type of object or direction may be used as a location indicator.

Figure 2:
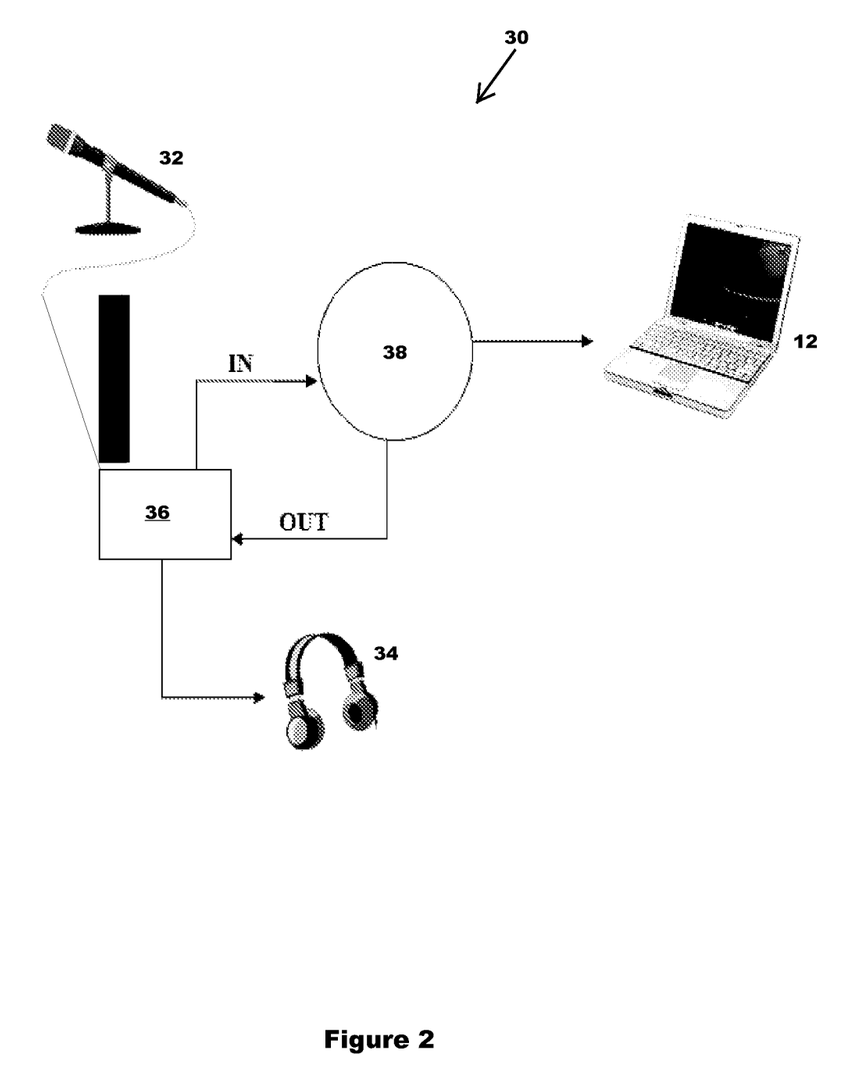
FIG. 2 illustrates a recording configuration according to the invention for making audio samples of instructions for use in performing a choreographed piece.

FIG. 2 illustrates an embodiment of a recording configuration 30 for making audio samples of instructions for use in performing a choreographed piece. A microphone 32 and headset 34 are connected to a Behringer mixer 36 for recording MP3 audio samples of instructions, which may be provided for a particular choreographed piece. The Behringer mixer 36 is connected to the personal computer 12 that e.g., is running a Sound Studio application through an iMic device 38 that provides feedback to the mixer, and it is connected via a USB connector to the personal computer 12. The personal computer 12 may be an APPLE MACINTOSH® computer, which is then utilized to store the audio instructions for the piece. It should be understood, however, that any digital device, such as a WINDOWS® compatible system that is capable of generating and storing MP3 files or other digital audio files, could be used. The audio instructions are next recorded onto media cards (not shown) and then inserted into each audio playback unit 22 (see FIG. 1). As explained above, when an event is initiated commands are transmitted by the wireless transmission system 20 and received by the audio playback units 22, which then play the audible instructions for each of the performers.

Figure 3:
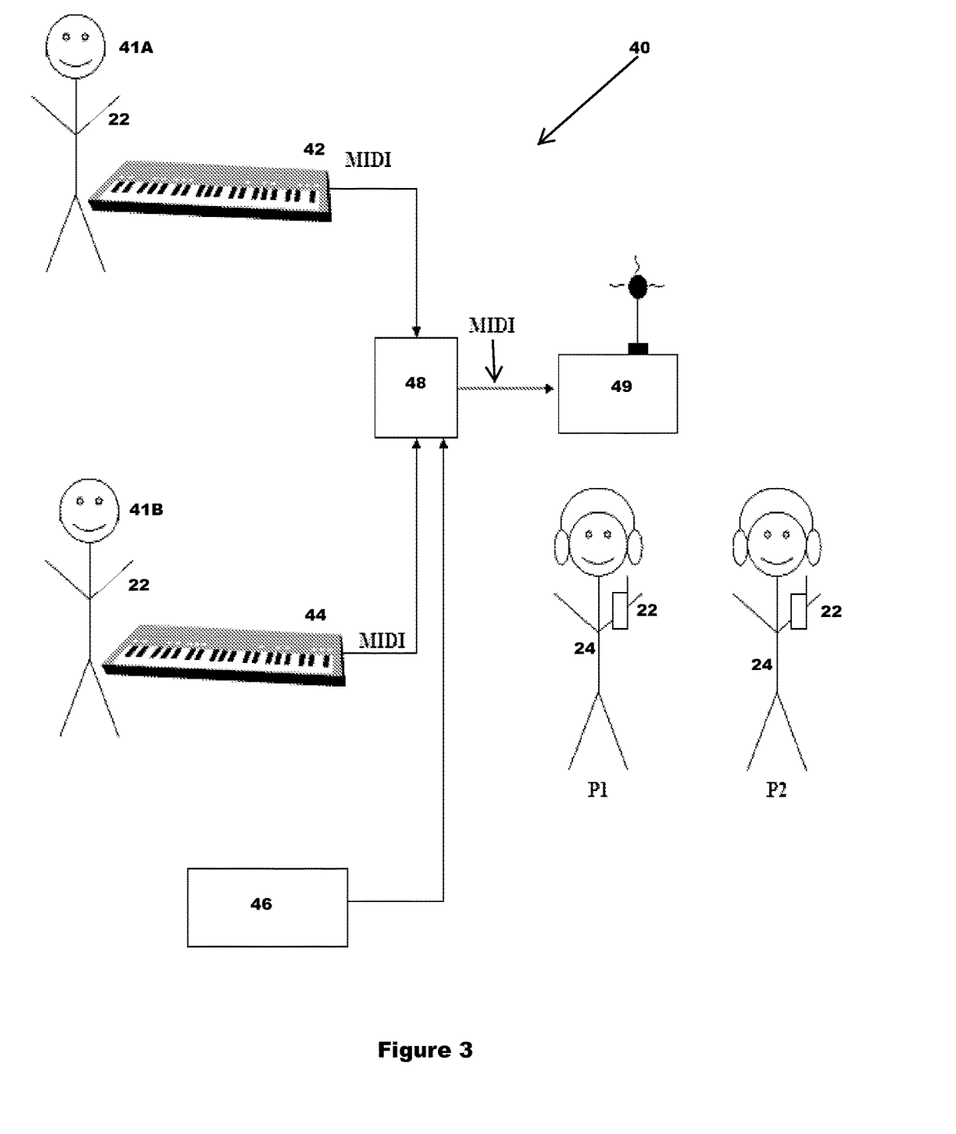
FIG. 3 shows an embodiment according to the invention of a configuration for creating and transmitting command signals in real-time for creating a choreographed demonstration event.

FIG. 3 shows an embodiment of a configuration 40 that could be used to create and transmit commands for choreographing a demonstration event. A first MIDI keyboard 42, a second MIDI keyboard 44, and another keyboard or MIDI source 46 are connected to a four input MIDI merge device 48. A plurality of choreographers 41A, 41B utilize the keys on the MIDI keyboards, and/or other control inputs associated with the MIDI source 46, to generate commands that are broadcast by the transmitter 49 to audio playback units 22. The choreographer(s) can push one or more keys simultaneously or sequentially to forward instructions to one or more of the participants that have the audio playback units. The audio playback units 22 receive the commands and provide audio instructions to a plurality of participants such as dancers or performers. As explained above, each of the dancers or performers understands what the words and/or instructions mean and is able to respond in real-time. The words and phrases may be broadcast in one or more languages, such as French or Japanese, that is understandable to each dancer or performer and/or group of dancers or performers.

Referring again to FIG. 1, a preferred embodiment of the system includes an APPLE MACINTOSH® computer 12 utilized to compose, store and generate a choreographed piece. A software program such as PROTOOLS® or similar program that includes digital audio and/or MIDI record and playback features could be used to create the instructions and commands for an event. Specialized TERP™ software, discussed below, or other specialized software could also be used. In an embodiment, the sequencing software can be written to comply with the standard Musical Instrument Digital Interface ("MIDI"), or it may be a custom application written specifically for such a system.

The audio playback units 22 are capable of playing MP3 digital files, and include a microprocessor or other controller unit. The playback units 22 include headsets with speakers that are small enough to be comfortably worn by each dancer or performer. The receiver and headphone unit is capable of stereo or mono MP3 playback, and uses 8 megabyte (Mb) or 16 Mb digital media such as "SmartMedia" flash memory cards (not shown) that use a standard "FAT-12" file system. All of the audio files that need to be played are loaded onto the flash memory cards. Thus, the actual audio instruction files do not have to be transmitted. Such a receiver unit can be used with any type of computer system. Each of the receivers 22 includes volume up and down buttons, an on-off switch, an internal lithium-ion rechargeable battery that is capable of at least eight hours of runtime, a sophisticated battery level monitoring device, and battery charging circuitry with power-in and charge-complete LEDs.

In an implementation, the set of actions to be performed are recorded as spoken words in standard MP3 audio format, and stored as files on the flash memory media cards. The receivers 22, and thus the dancers 24, are assigned or arranged into groups as defined by a configuration file on the flash memory cards. Digital commands are broadcast on different channels, wherein each channel corresponds to one group of receivers and thus to a group of dancers. Different performers can be part of different groups at different times during a performance, which may be controlled by software code running on one or more of the playback units 22. The commands for the transmitter may be written in JAVA code or other programming language. The wireless transmission system 20 may send digital commands via a standard 900 Mhz radio link, which is controlled by the computer sequencing software loaded on the personal computer 12. It should be understood that transmission systems utilizing, for example, "Bluetooth" or "WiFi" technology could also be used.

Figure 4:
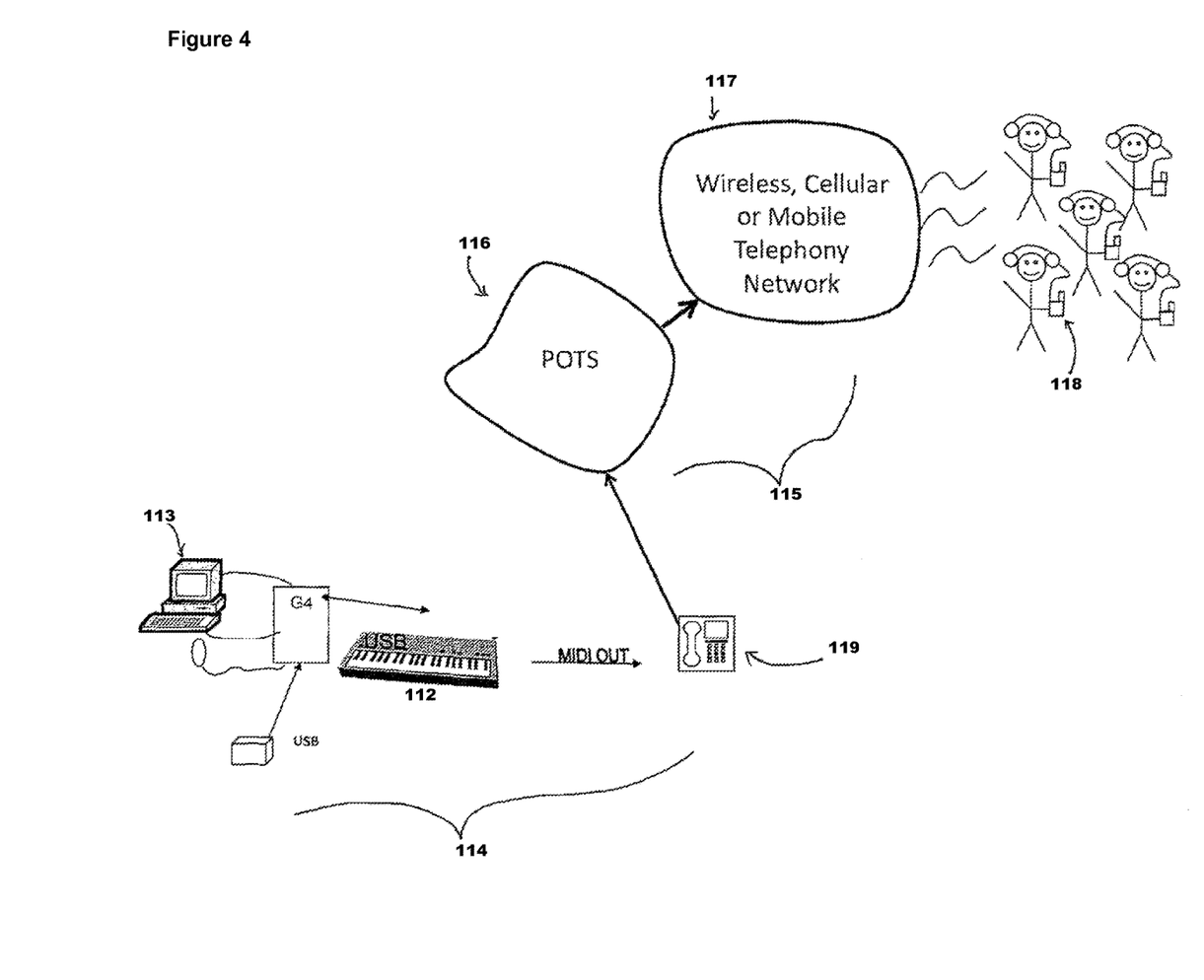
FIG. 4 illustrates an embodiment according to the invention, in which a multi-channel broadcast system is used to transmit command signals over a wireless, cellular or mobile telephone network.

FIG. 4 shows an embodiment in which the performers use wireless, cellular or mobile telephones 118 (mobile telephones) as their audio playback units. The wireless transmission system 114 includes a computer 113 that communicates with the keyboard 112 to send digital commands to the mobile phones over a telecommunications network, such as a telephone network 115, with the commands controlled by computer sequencing software loaded on the personal computer 113. In addition, the transmitter 119 consists of a computer for interpreting signals, as well as a telephone for transmitting the signals onto the telephone network 115. The telephone network 115 may consist of a combination of both POTS networks 116 (plain old telephone service) and mobile telephony networks 117, as well as any other telecommunications network that may be used to route communications to a wireless, cellular or mobile phone. In the alternative, if transmitter 119 is a wireless, cellular or mobile telephone, the telephone network 115 may consist of only mobile telephony networks.

In addition, the mobile telephone network 117 may provide uniform time and date information to each of the telephones on the network. The wireless transmission system 114 may synchronize with this time and date information to ensure that each performer will receive his or her instructions at the correct time. In another configuration, the wireless transmission system may provide a timing signal alongside each body movement instruction signal. Each performer's audio playback unit may then use this timing signal to determine when to play the instructions associated with the body movement signal. Accordingly, in the case each performers' mobile telephone receives uniform time and date information from the mobile telephone network, their playback of instructions will be time-synchronized.

The timing signal and body movement instruction signal may be transferred by any of the communication methods with which mobile phones are compatible, including a data signal over the mobile telephony network, SMS, "text message," "Bluetooth," or "WiFi." In one such embodiment, text messages sent to the audio units 118 could contain information in a predefined format, such as <BODY INSTRUCTION CODE>/<TIME TO PERFORM>/<LOCATION INDICATOR>. The phones can then be programmed to interpret messages in this format and play the appropriate voice commands at the appropriate times. In another embodiment, the TERP™ software encodes the body movement instructions in a unique set of touch-tones. Touch-tones are commonly used in telephony systems, for purposes such as navigating automated menus. In this particular embodiment, unique signals can correspond to particular body movement instruction or location indicator instruction, and can therefore be interpreted by the mobile phone to trigger a specific audio instruction.

As in the embodiment described through FIG. 1, the audio files, which are used to execute audio instructions, do not have to be transmitted. The audio instructions may be placed onto the mobile phones 118 through the use of media cards, such as a microSD media card, or by downloading the instructions to the mobile phones prior to the performance through any of the communication methods with which the mobile phones are compatible, such as "Bluetooth," or "WiFi." When an event is initiated, body instruction commands are transmitted by the transmission system 114 and received by the mobile phones 118, which then play the appropriate audible instruction for each of the performers.

In addition, software loaded on the mobile telephones 118 manage and organize incoming body movement instruction signals and timing signals. This software ensures that body movement instructions are converted to voice instructions in the correct order and at the correct time. This software also allows body movement instruction signals and timing signals to be sent to the mobile telephone in multiple forms during a single performance, for example, by touch-tone code and SMS, while maintaining the order and timing of the instructions.

Returning to FIG. 1, the transmitter unit 19 may accept data for transmission as proprietary packets on Recommended Standard-232 ("RS-232") or as standard MIDI messages. The receivers for a particular channel pick up the transmitted instructions and accordingly play the audio MP3 file or files stored on their media cards. The dancers then hear audible commands in their headsets and respond accordingly.

In an embodiment, the communications link is one-way between the transmitter system and the receivers or audio playback units 22. In an alternate advantageous embodiment, there is a two-way communications link between the transmitter system and playback units. The two-way communications link permits each playback unit to report statistics of the radio link, such as signal strength reception, to the transmitter system. For example, a test mode could be used to ensure that each playback unit is in range of the transmitter system before a performance is initiated. In addition, a check mode could be entered periodically during a performance to ensure that all of the playback units are still in range. Further, other status information could be garnered from the playback units, and updates could advantageously be made to the files on the flash memory media cards housed within each playback unit by wirelessly transmitting such changes, instead of having to manually update each memory card.

During operation, the transmission system 20 transmits a signal that signifies who, when, and what, to the receiver units 22 worn by the performers. The signal is received by the microprocessor included in each playback unit. The microprocessor contains all of the instructions, and triggers an audible language instruction to be played in the headphones for execution by the dancers. For example, a prerecorded MP3 file containing voice directions may be played for a performer. The program of a choreographed performance will thus consist of a number of instructions (for example, 10 to 20), or a long series of instructions (for example, 1000 instructions per hour) that may be transmitted over one or more channels.

As explained above, the commands can be generated from a written specification that is transcribed using customized software on the personal computer 12, or by using a commercial music composition program. A choreographer may use the personal computer 12 to change sequences of the actual sound waveforms shown on the screen of the computer display monitor by clicking on them with a cursor and dragging them to new positions. The sound waveforms may also be available from an object-oriented menu. Alternately, or additionally, the commands can be generated on a MIDI keyboard to manipulate the positions and actions of the actual performers in real-time. In yet another implementation, the commands for a particular performance could be generated by interacting with a model of the behavior and movement of the performers as shown on a second screen. Another advantageous feature that may be included is the capability to use a second display monitor to display a visual representation of the performance as it is occurring. This permits the choreographer to view a representation of an event or performance when people move from one position to another in real time.

Figure 5:
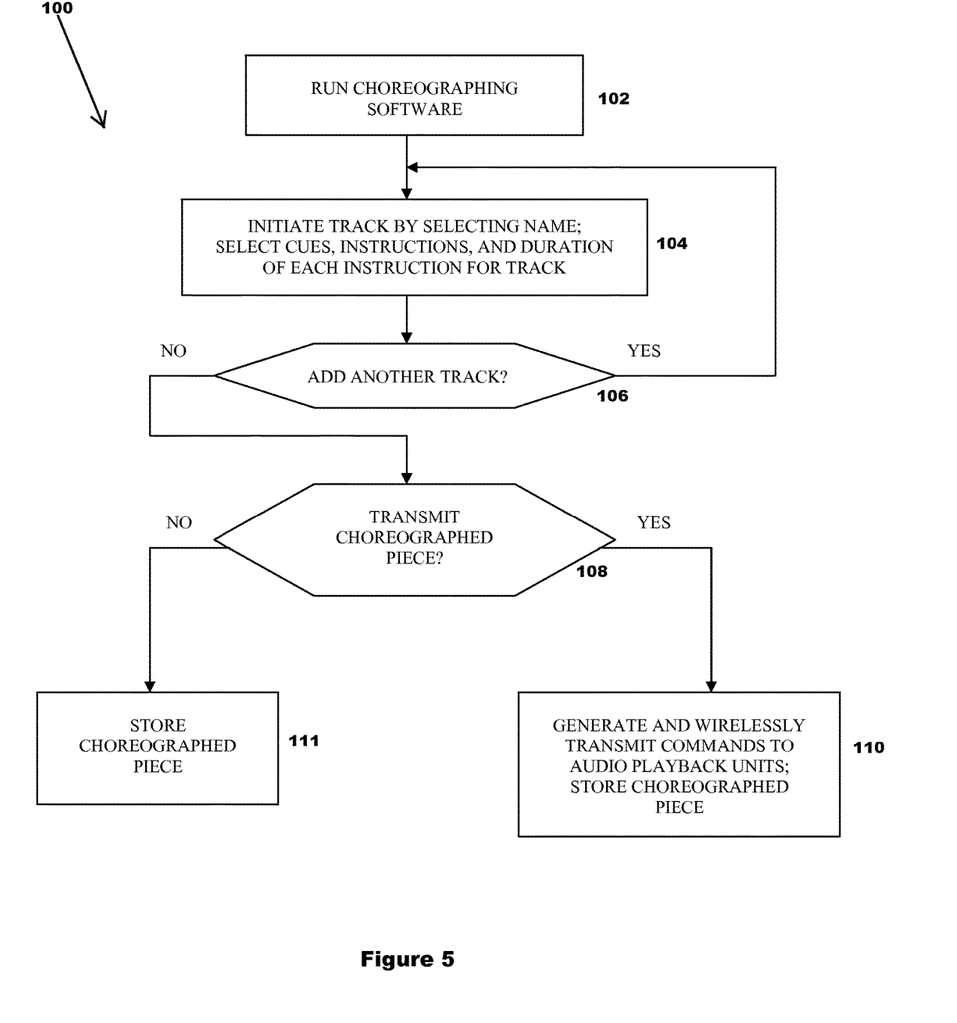
FIG. 5 is a simplified flowchart illustrating an embodiment of TERP™ choreographing software according to the invention for running on a personal computer.

FIG. 5 is a simplified flowchart 100 illustrating an embodiment of a TERP™ choreographing software program, which in this example is run 102 on a personal computer. In a preferred embodiment, object oriented menus are presented to the choreographer to create the choreographed piece, and the choreographing or performance software permits the choreographer to make selections by using input devices such as a keyboard and/or mouse. In an implementation, the choreographer starts the process by opening a new file and naming a track, and then selects cues, instructions and the duration of each instruction for that track 104. The track then includes a performance sequence that may consist of movement instructions, states, and properties, which will be discussed, in detail below. The choreographer then decides whether or not to add another track 106. If not, she may choose to transmit the choreographed piece 108, in which case command signals are generated and wirelessly transmitted 110 to the audio playback units. The choreographer(s) can simply press buttons on the computer or midi, triggering a signal to deliver a movement command or commands synchronously to a person or persons wearing head sets, and performing the commands. The commands can be forwarded to mobile phone or device or units capable of midi. This could easily be done via a server. The choreographed piece may also be stored at this time for possible playback at a later date. If she chooses not to transmit the choreographed piece in step 108, then it is stored 111, for example, in a memory location on the personal computer.

Figure 6A:
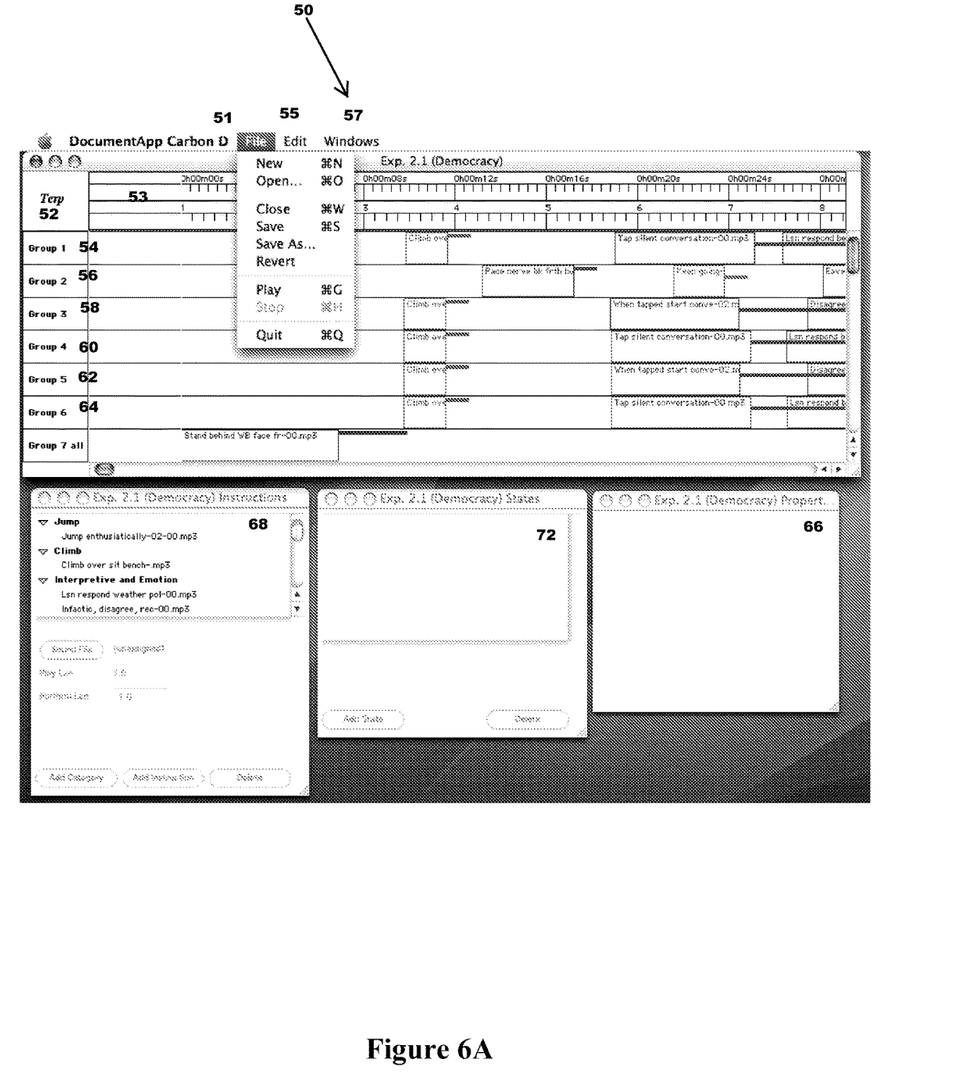
FIGS. 6A to 6C are screen shots of a computer screen of input menus and/or windows of an embodiment of a TERP™ software program according to the invention that allows a choreographer to create a performance piece.
Figure 6B:
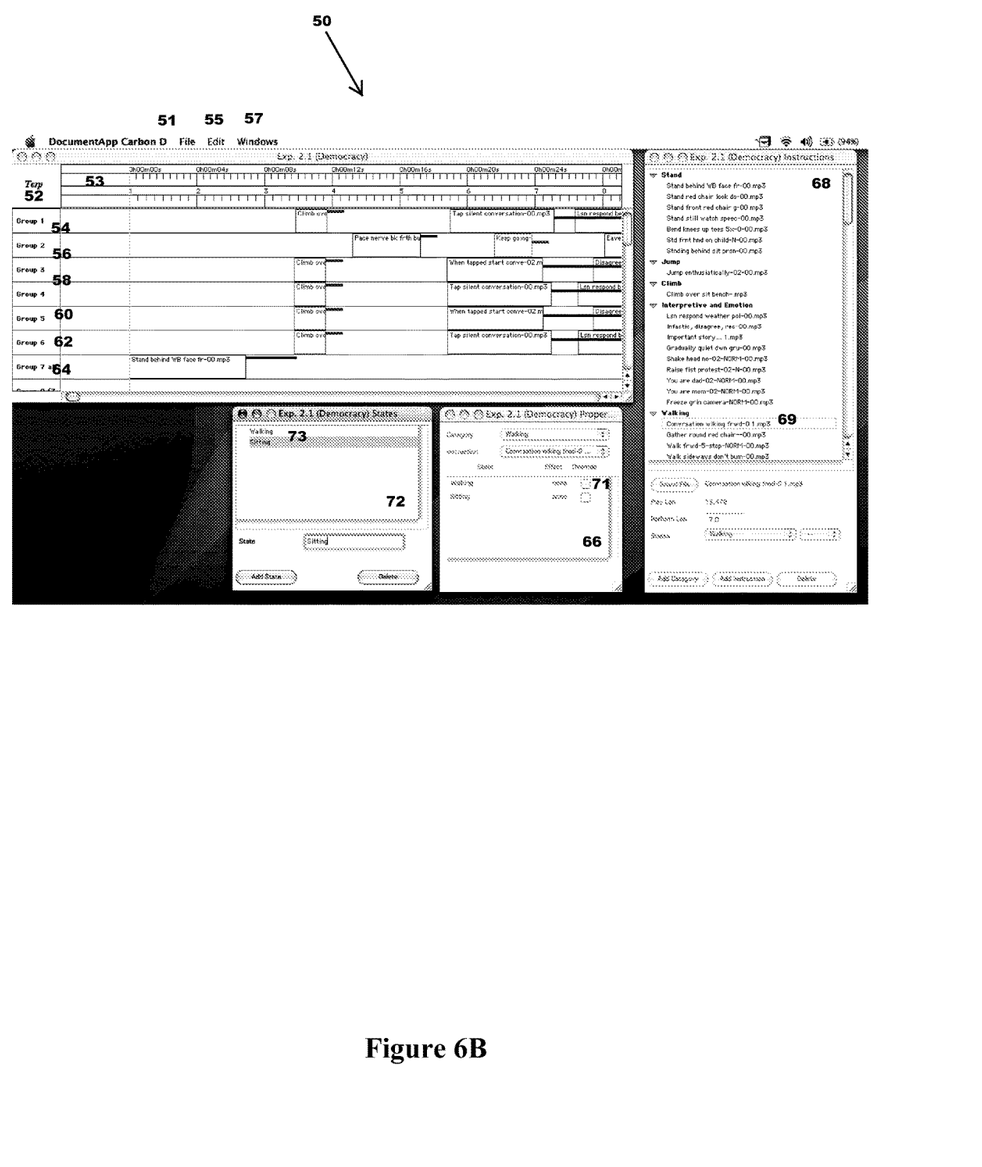
Figure 6C:
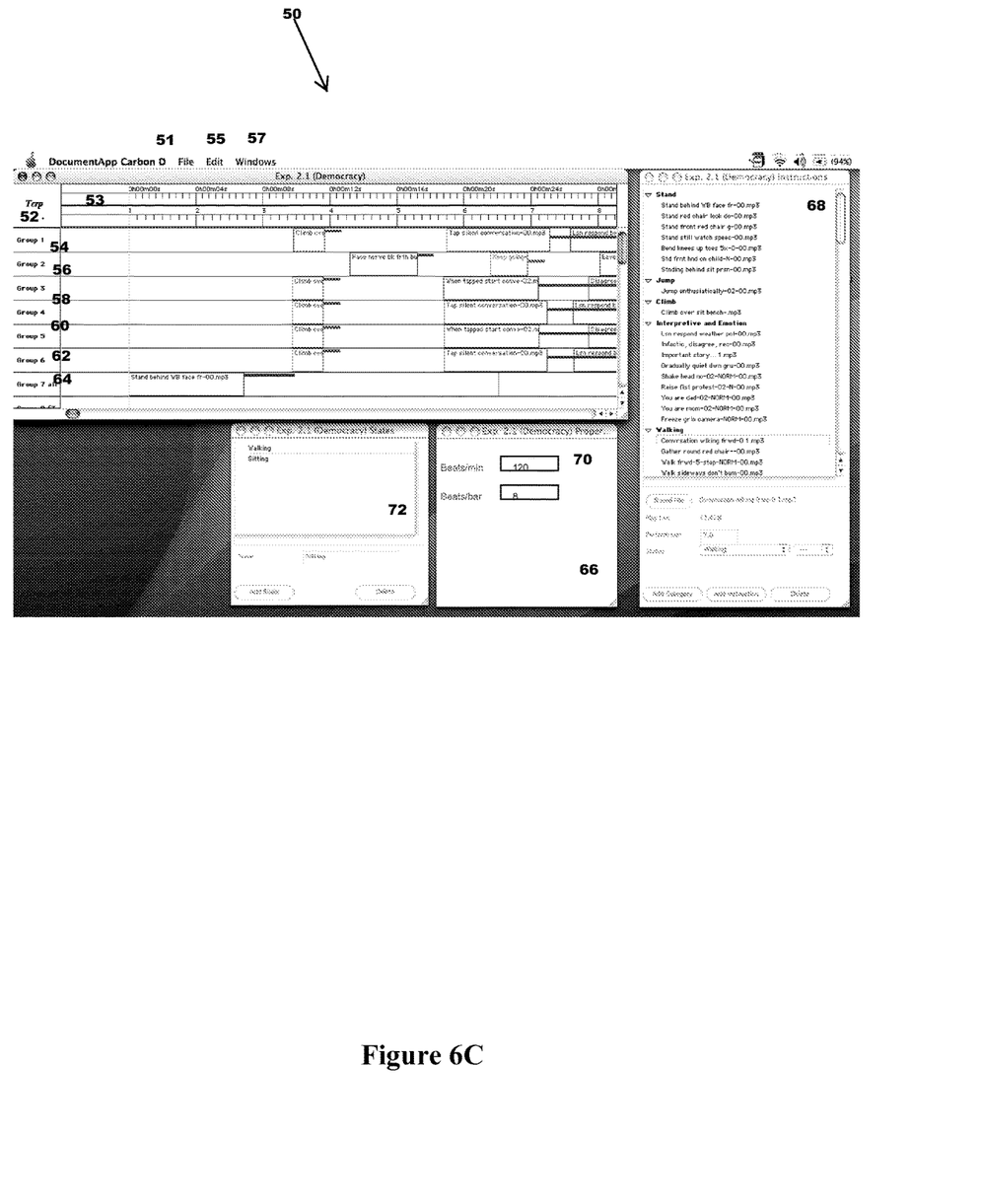

FIGS. 6A to 6C are screen shots of exemplary input menus and/or windows of an embodiment of the TERP™ software program that may be displayed on a computer screen for a choreographer to enable her to create a performance piece. The software enables the choreographer to generate a written representation of a performance piece, and as a result can be used as a preview tool. In particular, a choreographer can create a written description of synchronized actions and/or location indicator instructions for a plurality of performers, which helps her to visualize the piece before it is actually performed.

FIG. 6A shows an input screen 50 having the "File" drop down menu 51 opened, wherein several selections can be chosen including opening an existing file or creating a new file. Other functions, such as close, save as (revert), play (stop), and quit are also available. Predetermined key combinations can be performed to obtain desired functions, such as holding down the "Cmd" and "N" keys to open a new document.

FIG. 6A also depicts a "Terp" box 52, six tracks 54, 56, 58, 60, 62 and 64, a "Properties" window 66, an "Instructions" window 68, and a "States" window 72. Each of the tracks 54 to 64 can all be assigned a unique name, and each track represents a separate channel that contains one or more instructions. The relationship of bars and/or beats, which relate to the duration of an instruction or to a sequence of instructions, is set by clicking the "Terp" box 52 and then setting the appropriate fields in the "Properties" window 66, which will be explained in more detail below. A timeline 53 is also depicted that includes rulers for indicating the real-time duration of instructions, and indications for the bars and/or beats. In an implementation, the timing of instructions is measured from the end of each instruction. For example, the instructions "go to the red flag" (10 seconds) "raise your arms" means that the performer has 10 seconds to go to the red flag before the next instruction, "raise your arms", is executed.

The "Edit" command box 55 can be chosen to reveal a drop down menu (not shown) to select actions to "add tracks", "select all", "delete selected tracks", to change "preferences" and to "test" the choreographed piece. A user may also use key combinations to perform the desired actions, such as "Cmd-J" for adding tracks. To delete tracks, a user would click or shift-click on track indicators (appearing on the left side of the document) and then select Edit→Delete Selected Tracks, or use the key combination "Cmd-K". To add cues to tracks, the user can Cmd-click in the appropriate tracks. New cues come up as unassigned. Edit-Preferences may be used to set a serial port to which the program will output.

The "Windows" command box 57 can be selected to obtain a drop down menu (not shown) that includes selections to "zoom in horizontally", "zoom out horizontally", "zoom in vertically", and to "zoom out vertically". The drop down menu for the Windows box 57 also has selections to "show instructions", "show conditions", and to "show properties".

FIG. 6B shows an opened "Instructions" window 68 that has been moved to the right side of the computer screen. The Instructions window is displaying categories such as "Standing", "Climb", "Interpretive and Emotion", "Walking", "Speak" and "Relate". Selections under these categories, such as "conversation walking forward" 69 which is found under "Walking", can be chosen to appear in one or more of the tracks 54-64. In particular, clicking on a cue accesses the cue parameters. Cue parameters are which Category and then which Instruction in the Category to assign to the cue, and a selected Instruction may affect one of the States. For example, the "States" window 72 in FIG. 6B is open and highlights the "Sitting" state 73. The sitting state is affected by some instructions such as "climb over and sit", which may be chosen under the "Climb" category in the Instructions window.

FIG. 6C shows the "Properties" window 66 open. As mentioned above, the relationship of the bars and/or beats (duration information) is set by clicking the "Terp" box 52 and then filling in the desired beats per minute and beats per bar in the "Properties" window 66. In this example, the "Beats/min" and "Beats/bar" input boxes 70 are depicted, and a user has chosen 120 beats per minute and 8 beats per bar. The Properties window 66 permits a user to edit the show, and to track or cue parameters.

Track parameters may be accessed by clicking the track name (on left side of the document). States that are set by the current cue, or an earlier cue in the timeline, may be shown in a color that is different than other displayed colors, such as red. The cue name can also be underlined in the timeline. Clicking an "Override" check box 71 (shown in FIG. 6B, in the Properties window 66) will clear the State for this and subsequent cues.

Referring again to FIG. 6B, the Instruction window can be used to create Categories, to assign colors to various categories, to add Instructions to the Categories, to assign MP3 files to the Instructions, and to edit the effects on States for the Instructions. In an implementation, Category parameters are the category name and color. In addition, Instruction parameters are the assigned sound file, the play length (computed automatically, which is typically not available for editing), the perform length (the time it takes to perform an instruction), and the State effects. An Instruction can set a State, clear a State, or have no effect on a State.

As shown in FIG. 6C, the State window 72 permits a user to create or add States. States are effects caused by Instructions (such as the state of walking or having one's arms up in the air). In an implementation, if a Cue in a Track is assigned an Instruction which sets a State, subsequent Cues in that Track will show as underlined and that State will be a red color in the cues' property list. That State will be red in color until an Instruction which clears the State is encountered in that Track, or if the State is overridden in a subsequent Cue's properties.

Referring again to FIG. 6A, in the File 51 drop down menu, selecting the "Play" command (Cmd-G) causes the timeline to begin moving to the left. As a Cue passes the current time line (which may be indicated with a stationary yellow vertical line), play data is sent out the serial port to the transmitter to cause the Cue's sequence of Instructions to be played by the audio playback units corresponding to that Track. The Track number of the Cue corresponds to a group number of the audio playback units. The Stop selection (Cmd-H) stops playback. The Cut and Copy selection copies the currently selected Cues into a cut buffer. The Paste selection will paste the Cues at a selected insertion point (which may be the last point clicked in the document).

FIG. 7 is an exemplary illustration of a performance event configuration 700 according to an embodiment of the invention. Performance event configuration 700 is intended as an example and the present invention is not limited to only this configuration or the examples listed. Performance event configuration 700 includes audience 702, several location indicators 704, and one or more walls 706. It should be appreciated that a performance event configuration may not include a formal audience if the purpose is for practice. Although, the instructor/directory may be considered the audience during a practice. Each location indicatory 704 indicates a specific location within the performance event location that an individual or a group of individuals may be instructed to perform body movements relating to the location indicator 704. The individual may be instructed to perform body movements in the direction of a specific location indicator 704 and/or may be instructed to interact with a location indicator, etc. The walls 706 may also be considered location indicators or may have one or more location indicators located on the walls 706. As illustrated by performance event configuration 700, the location indicators

704 may be various sizes and shapes and placed throughout a performance event location. The location indicators 704 may also be identified by colors or other identifying features. One benefit to including location indicators is in the situation when instructing small children or beginning performers who might not know stage directions, etc. Another benefit is being able to achieve complex spatial patterns with no previous explanation or knowledge of space necessary. Also, in the situation when utilizing the present invention with small children, using fun location indicators may hold the a child's attention for longer than more traditional methods.

The choreographing software may include several enhancements, such as an artificial intelligence capability for providing translations, and/or to augment the choreographer's judgment. For example, English directions may be translated into Japanese, and the software may be capable of indicating to a choreographer that a certain sequence of movements would not be possible or would be very difficult for a dancer to perform. For example, as a piece is being created, the software may be capable of indicating that a particular selected sequence of movement instructions would be very difficult for a dancer to perform (For example, a dancer should not be asked to perform a leap immediately after assuming a sitting position).

The choreographing software may also include the capability to synchronize outside events with the performance. For example, the movements of groups of performers could be synchronized with the movement of robots, the cueing of a band, the bursting forth of water from fountains, and the like.

The embodiment of the TERP™ software tool described above allows a choreographer to easily create and play a choreographed piece, and permits performers to quickly and easily move about to perform the piece. The software tool may be further enhanced to include one or more advantageous features. In particular, for each movement instruction, five option items may be offered that include "SUBSTITUTE", "CHANGE", "FOLLOW", "PRECEDE", and/or "KEEP OR DROP". The SUBSTITUTE option would be used when a command such as "run" is chosen, to offer the user other moving instructions like "walk" or "skip". If the category of instructions was static shapes, such as "hands on your head" then SUBSTITUTE would suggest "right arm front, left arm back." CHANGE displays the list of primary instructions, not including follow up instructions or preceding instructions, that permits a user to choose to change from one kind of event to another. For example, a change of event may include changing from a moving instruction to a static shape instruction. The FOLLOW option displays all the instructions, which usually follow a given instruction. For example, if the instruction "run" has been selected, then FOLLOW offers "faster", "keep going" or "to the red flag". The PRECEDE option results in displaying all the usual PRECEDE instructions that are normally used for the chosen instruction. For example, if "walk" has been selected, then PRECEDE offers "get ready", or "face the red flag", or "find a partner". The KEEP OR DROP option queries if the physical condition of the previous instruction should be kept or dropped. For example, if "sneak up on the person closest to you" has been selected just after "hands over your face", then the KEEP OR DROP option will query if the "hands over your face" instruction should be dropped.

In another beneficial variation, the TERP™ software is capable of automatically updating the options in each menu. For example, when a particular instruction is used often in certain circumstances, such as in FOLLOW or PRECEDE for any particular instruction, then such a popular instruction should go to the top of the list. When an instruction is not used for a predefined long period of time, the program may query if it should be deleted from the list. A choreographer will be given the option to "save this instruction until further notice" instead of deleting it so that important yet not often used instructions are saved. Deleted instructions may be saved on a clipboard until the time they are finally deleted.

In another beneficial embodiment, the TERP™ software program is capable of learning new instructions and suitably categorizing them. Also, one or more of the following options may be offered. A GLOBAL UNISON option permits any instruction to be broadcast across all channels so that all participants in unison perform the instruction. The performance in unison is maintained whether or not FOLLOW and PRECEDE are used in separate channels to change what happens before or after the GLOBAL UNISON option. An IF-THEN FUNCTION allows formulation of specific sets of instructions. For example: "If channels 1, 2, and 3 are turning, then channels 6 and 7 sit down". A CANON OR DELAY FUNCTION operates by choosing a section across the plurality of channels to create a canon. For example, if the function is: "10 second canon starting from channel one through channel 8", then the first event of this segment in channel 2 occurs 10 seconds after the first event of this section in channel one. Likewise, if the function for any given section is: "5 second canon starting from channel 2, then 4, then 8", then the remaining channels will not be involved in the canon function.

The choreographing system aids in the dynamic placement of people in a manner that saves time, is fun, and is efficient. The choreographing tool may be used as an interactive rehearsal and production tool for theater, filmmaking and dance. In the case of filmmaking, the tool may be used to create instant crowd scenes. In the case of theater use, it may be used to interactively and quickly facilitate the marking of stage placement and direction of motion. For dance choreography, the tool may be used to edit sequences and to see the results quickly. The tool may also be used when a person is creating virtual environments using chromakey technology, computer animation, and live action. The tool can be used in each of these situations because it provides for the precise placement and movement of performers, for example in a blue screen studio situation in a manner completely synchronized with the virtual action and the accompanying music.

The system could also prove useful in attempting to coordinate a large crowd, including attendants at a sporting event such as a football, baseball or soccer match. Fans could be prompted to cheer, chant or perform a fight song in a coordinated manner. In addition, fans could be prompted to hold up placards in a coordinated manner to create large scale images that appear across an entire stadium.

The tool could also be used in several other entertainment applications. For example, the tool may be used to create a game for people to play involving interactively choreographing ideas with friends, for example, by using one or more MIDI keyboards. Another example would be creating a virtual game show, or a completely interactive exercise program. Or people may acquire a pre-recorded TERP™ piece for an event like a child's birthday party.

In a particular application of the choreographing tool, a group of selected participants, each of whom is unrehearsed, wears small headsets and follows and interprets the pre-defined instructions. The instructions are included in a conceptual dictionary of over 5,000 entries. The participants all cooperate to obey the instructions resulting in a choreographed crowd scene that may tell a recognizable story without rehearsal. Included in such an event is a MIDI-controlled synchronization with music, water fountains bursting, and town lighting. As an expressive experience of motion, participants find themselves in a new world of physical discovery at once private, yet one that builds to an exhilarating, unprecedented group event under the direction of a choreographer. Such an event could easily take place in several cities, and may even be performed simultaneously. Thus, although humans interpret as individuals, we are all part of a bigger picture. This picture is the human experience expressed through body movements. It is also envisioned that the choreographing tool could be used to create an event that changes the environment. In fact, as performers move through the experience, the environment responds.

A preferred implementation of the software tool thus utilizes object oriented programming to generate commands for a choreographed piece in real-time, includes artificial intelligence to facilitate the creation of the piece, and includes the capability to synchronize outside events with the movements of the performers. Other implementations of the system includes, but is not limited to, technical savvy individuals who use their devices as a vehicle to interaction with the world; advertising agencies and people interested in new forms of social interaction, e.g., flash mobs; the gaming industry and the ever expanding group of gamers who have purchased motion gaming consoles; physical therapists and medical researchers involved in patient therapy movement; educators looking for innovative kinetic methods to teach and learn; and businesses benefitting from innovative and fun ways for personal interaction, such as dating websites and team building events.

The software tool provides the functionality to compose, direct and drive human movement without rehearsal. The software tool may corral a group of five-year olds, refine the flash mob concept to spark genuine spontaneity or blast inhibitions in the blind dating world. As technology becomes more invisible, the software tool creates a unique bridge, utilizing the smartphone as a wearable computer to allow person-to-person interactive gaming. The software tool technology pilots everyday people through all types of social interactions and spaces. It can provide a voiced GPS to non-dancers. It should be appreciated that the examples described above are merely examples and the present invention is not limited to only these examples.

What is claimed is:

1. A method for choreographing and synchronizing movement of individuals for a performance event at a performance event location by using a real-time application comprising:
  implementing the real time application, wherein the application implements a process executable on a wireless audio unit; and
  synchronously transmitting body movement instruction signals in real time to the wireless audio unit of an individual who is participating in the performance event, wherein the signal instructs the audio unit to play audio directions for the individual to carry out body movements at appropriate times, with the audio directions also including directions to the individual to perform the body movements at, towards or away from at least one indicator at the performance event configuration, and to create interaction between other individuals that are participating in the performance event, so that the carrying out of the body movements by the participating individuals results in a choreographed performance event;
  wherein the performance event configuration is a performance stage having a stage floor and location indicators comprising marked floor positions and peripheral markings outside of the stage floor, wherein the location indicators identify to an individual a specific area of the performance event location.

2. The method of claim 1, wherein the body movement instruction signals are synchronized to time and date information maintained by a network.

3. The method of claim 1, wherein the body movement instruction signals are synchronized to the individual independently of the time at which the instructions are actually sent.

4. The method of claim 1, wherein the body movement instruction signals are transmitted to the audio unit under the control of a suitably programmed computer or computers and wireless transmitter(s), wherein the audio unit establishes the timing for the actual presentation of each audio direction using a local clock with sufficient accuracy to insure synchrony of coordination with other participants.

5. The method of claim 4 wherein the computer or computers are operated by one or more pilots or choreographers who randomly select the body movement instruction signals to be transmitted to the audio unit or units.

6. The method of claim 1, wherein the application further comprises:
  providing access to a profile that is specific to the individual by way of a login name and password, wherein the profile includes preferred specific commands for use;
  allowing the individual to download specific commands for the purpose of conducting a performance having a common theme; or
  messaging others to download the application in order to share the specific commands or participate in the performance; or
  messaging others of a scheduled performance; or
  updating or managing content through a content management system; or
  providing combinations of the above.

7. The method of claim 1, wherein the body movement instruction signals are transmitted by SMS, text message or using a touch tone.

8. A method of choreographing and synchronizing movement of individuals for a performance event, which method comprises:
  providing a performance event configuration, which comprises a plurality of location indicators placed throughout a performance event location;
  providing each individual of a group with a wireless audio unit that includes a real time application that comprises synchronously transmitting body movement instruction signals in real time to the wireless audio unit of an individual who is participating in the performance event, wherein the signal instructs the audio unit to play audio directions for the individual to carry out body movements at appropriate times, with the audio directions also including directions to the individual to perform the body movements at, towards or away from at least one indicator at the performance event configuration, and to create interaction between other individuals that are participating in the performance event, so that the carrying out of the body movements by the participating individuals results in a choreographed performance event;
  wherein the body movement instructions are provided by a software tool that utilizes object oriented programming to generate commands for a choreography event in real-time, and the software tool is loaded on the mobile wireless devices that manage and organize incoming body movement instruction signals and time signals for the individuals; and wherein the carrying out of the body movements by the individuals results in a choreographed performance event on the performance stage.

9. The method of claim 8, wherein the marked floor positions comprise an alphanumeric character, a color, one or more lines, or a symbol, while the peripheral markings are positioned outside or above the performance stage and include a wall or curtain marking, a light, a flag, a post, or other identifiable or recognizable object including clothing or other individuals.

10. The method of claim 8, wherein each wireless audio unit comprises a wireless mobile or cellular phone.

11. The method of claim 8, wherein the body movement instruction signals include voice commands that include a two-step "When I Say Go (WISG)" voice command, and the second step in the voice command is timed to trigger the initiation of the body movements.

12. The method of claim 8, wherein the body movement instructions include coded commands that are selected from a compilation that is provided to the individuals, and the compilation provided includes a compilation of coded commands that is stored in the audio units with the body movement instructions comprising known movement instructions that have been cumulatively developed for the performance event with suitable codes representing each entry, and further wherein the coded commands are transmitted to the audio units and are used to select the appropriate body movement instructions from the compilation stored in the audio units.

13. The method of claim 8, which further comprises synchronizing with the received voice commands at least one element of music accompaniment or visual effects of changing scenery, and providing the synthetic spatial placement of voice commands in a virtual sound field with appropriate background sound or music to improve the effectiveness of communications to the individuals whose motions are being choreographed.

14. The method of claim 8, wherein the performance event is an artistic performance; an interactive game; a medical, emotional or psychological therapy; or an educational or training exercise for the individuals, and the movements of the individuals of the group are choreographed and coordinated to carry out the performance event.

15. The method of claim 8, which further comprises providing choreographic movements to additional individuals that do not have audio units to further enhance the event, wherein at least some of the individuals are remotely located from others in order to achieve a multi-geographical event.

16. The method of claim 15, wherein at least some of the individuals are remotely located from others in order to achieve a multi-geographical event.

17. The method of claim 8 wherein the body movement instruction signals are transmitted to the audio unit under the control of a suitably programmed computer or computers and wireless transmitter(s), wherein the computer or computers are operated by one or more pilots or choreographers who randomly select the body movement instruction signals to be transmitted to the audio unit or units.

18. The method of claim 8, wherein the instructions are provided from coded voice commands that instruct the person to perform the artistic body movements, wherein the commands comprise known movement instructions that have been cumulatively developed for the performance.

19. A method for choreographing and synchronizing movement of individuals for a performance event at a performance event location by using a real-time application comprising:

implementing the real time application, wherein the application implements a process executable on a cellular phone or other audio unit; and synchronously transmitting body movement instruction signals in real time to the cellular phone or other audio unit of an individual who is participating in the performance event, wherein the signal instructs the cellular phone or other audio unit to play audio directions for the individual to carry out body movements at appropriate times, with the audio directions also including directions to the individual to perform the body movements at the performance event configuration, and to create interaction between other individuals that are participating in the performance event, so that the carrying out of the body movements by the participating individuals results in a choreographed performance event;

wherein the body movement instruction signals are transmitted by SMS, text message or using a touch tone;

wherein the performance event configuration is a performance stage having a stage floor comprising location indicators; and wherein the body movement instruction signals are transmitted to the cell phones or other audio units under the control of a suitably programmed computer or computers and wireless transmitter(s), wherein the computer or computers are operated by one or more pilots or choreographers who randomly select the body movement instruction signals to be transmitted to the cell phones or other audio units.

20. The method of claim 19, wherein the body movement instructions are provided by a software tool that utilizes object oriented programming to generate commands for a choreography event in real-time, and the software tool is loaded on the mobile wireless devices that manage and organize incoming body movement instruction signals and time signals for the individuals.

* * * * *